Sept. 8, 1959    B. DUBSKÝ ET AL    2,902,768
ELECTROMAGNETIC EXTENSOMETER
Filed Sept. 18, 1957
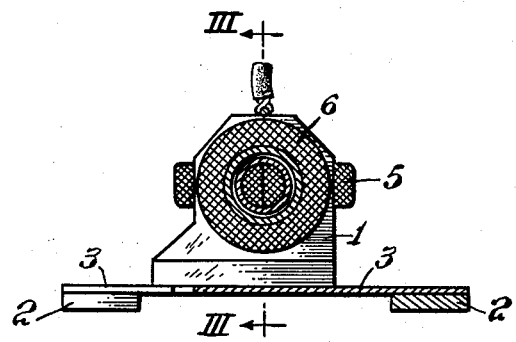
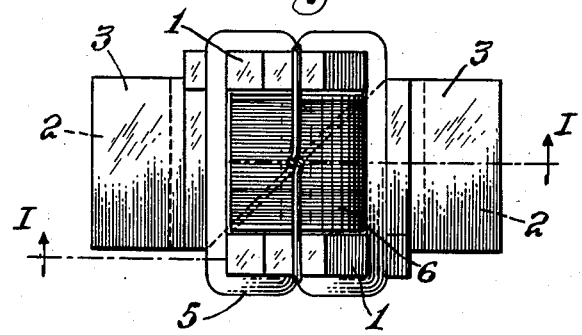
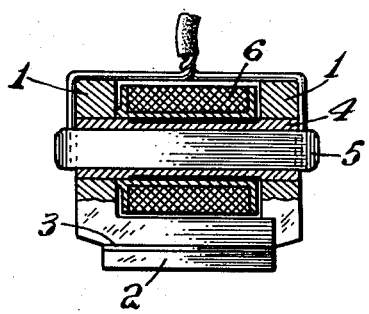
INVENTOR.
Bořivoj Dubský
BY Oldřich Straka

2,902,768

ELECTROMAGNETIC EXTENSOMETER

Borivoj Dubsky and Oldrich Straka, Prague, Czechoslovakia, assignors to Vyzkumny a zkusebni letecky ustav, Letnany, near Prague, Czechoslovakia Application September 18, 1957, Serial No. 684,723

Claims priority, application Czechoslovakia September 20, 1956

2 Claims. (Cl. 33—148)

The present invention relates to an electromagnetic extensometer for measuring minute changes in length, caused for example by a stress in the material, by temperature changes and the like.

There exists a great number of extensometer designs, among which there are many types of electric extensometers. The widest used is the generally known resistance tensiometer.

The design of the extensometer according to the present invention resembles most this last mentioned type of tensiometer as far as its use in the measuring technique is concerned. Although the resistance tensiometer appears simple at first glance, its manufacture is highly difficult and the accuracy of measurements made therewith depends on the care exercised in manufacture.

Apart from the fact that a tensiometer of this type is sensitive, as far as manipulation, temperature changes, humidity and ageing are concerned, a further disadvantage lies in the fact that it may be used only once, without the possibility of verifying its properties by recalibration. The measurement itself is effected by means of an intricate and costly measuring apparatus. Other types of existing extensometers are either complicated, while requiring a more or less simple measuring apparatus, or on the contrary, the extensometers are simple but have relatively poor accuracy and are not capable of universal use.

The electromagnetic extensometer according to the present invention comprises substantially a device which transforms the deformation of the measured material into the twist of a ferromagnetic rod. Further use is made of a known phenomenon to the effect that, when a ferromagnetic rod which is cylindrically magnetised by alternating current is twisted, an electromotive force proportional to the twist of the rod is induced in a coil fitted on the rod. This method of transforming the deformation of material into an electromotive force has, contrary to other know methods, the important quality, that a simple exciting and pick-up device is used for obtaining the electromotive force. Further, the method is a direct one, without intermediate stages, which are the usual cause of inaccuracies and impaired efficiency of transformation. In comparison with any hitherto known extensometers, the device according to the invention is most accurate and measurements can be made with the device in the simplest, and therefore cheapest, manner.

The structure of the electromagnetic extensometer embodying the invention may be arranged in many ways, which depend on the nature of its use and its size.

A typical embodiment of the invention is shown diagrammatically in the accompanying drawing, wherein—

Fig. 1 shows the extensometer in an elevational view, and partly in section along the line I—I of Fig. 2.

Fig. 2 in a plan view and

Fig. 3 in a side view, partly in section along the line III—III of Fig. 1.

The extensometer according to the present invention consists substantially of four parts: A transformation part, a torsional body, an exciting part and a pick-up part.

The transformation part consists of two identical end pieces 1 each in the shape of an iron angle having an upstanding leg and a horizontal leg which is obliquely cut, as shown in Fig. 2. The horizontal legs of end pieces 1 are connected with respective base plates 2 by means of strips 3. The upstanding legs of the two end pieces 1 are connected together by a torsional body 4 of tubular shape. The exciting part consists of a toroidal coil 5 and the pick-up part of a coil 6. The exciting and pick-up circuit may be interchanged. The exciting current is checked by an amperemeter (not shown) and the pick-up voltage is measured by a voltmeter (not shown). The base plates 2 may be replaced by points or edges by means of which the extensometer is placed against the measured material.

The measuring operation with the described extensometer is carried out by securing the base plates 2 of the tensiometer onto the measured material. The latter, upon its extension or shortening, transmits motion through the strips 3, which act as joints, to the horizontal legs of end pieces 1 to move the latter angularly about the axis of the torsional body 4 in opposite directions, thereby to twist the body 4.

A composite stress is produced in the torsional body 4, which includes a torsional stress. When an electromagnetic field in the shape of coaxial circles is produced in the torsional body 4, by the exciting current in the toroidal coil 5, said electromagnetic field is deformed by the torsional stress so as to generate a longitudinal component parallel to the axis of body 4 which is proportional to the magnitude of the twist or extension of the material and which induces in the pick-up coil 6 an electromotive force which may be measured with the voltmeter.

The electromagnetic extensometer, in the described arrangement, serves for measuring the deformations resulting from tensile and compressive stresses. After a suitable adjustment of the end pieces 1 it may be used also for measuring the deformations resulting from shearing stresses and therefore also for measuring bending and torsional strains. For measuring the deformations of dam-blocks the design of the extensometer is similar, but naturally in a suitably enlarged embodiment.

When the coefficients of thermal expansion and contraction of the measured material and the extensometer differ, it is possible to use the extensometer for directly measuring the temperature or, in the case where the deformation is to be measured, the influence of the temperature has to be eliminated by the use of a compensation extensometer in the same way as previously employed in connection with resistance tensiometers.

The disclosed extensometer may serve in all technical fields for measuring minute changes of length, irrespective of whether they are caused by a stress in the material, thermal expansion or contraction or movement of the ground.

The tensiometer according to the invention may preferably be used for ascertaining the deformation of water-dam crowns, the movement of rock, in particular in mines, the magnitude of mountain pressures, rolling pressures, the pressure of mining equipment and other big mining machinery, the tractional force of chains, the strain of machinery components in dangerous points (as a safety-device).

In all instances mechanical deformations or relative movements are transformed in a simple and accurate manner into electromotive forces, which may be recorded or measured at a remote point with a voltmeter, or which may be used for actuating a safety relay and the like.

A further advantage of the invention is the simplicity of the apparatus, which may operate even without electronic measuring devices.

We claim:

1. An electromagnetic extensometer comprising a ferromagnetic torsional body, exciting means for producing an electromagnetic field in said body in the shape of coaxial circles, end pieces rigidly connected to the opposite ends of said body, transmission strips extending from said end pieces in a plane which is parallel to, and offset from the axis of said body, means on said strips adapted to be secured to the material to be measured so that the expansion and contraction of the latter causes said end pieces to be relatively angularly displaced about said axis of the torsional body to twist the latter and thereby deform said electromagnetic field produced by said exciting means so as to provide a component of said field in the direction of said axis of the body, and a pick-up coil having an electro-motive force produced therein by said component of the field in said direction of the axis of the torsional body.

2. An electromagnetic extensometer as in claim 1; wherein said end pieces are in the form of iron angles having legs extending in planes perpendicular to said axis of the body and obliquely cut legs extending toward each other parallel to said axis and spaced from the latter, with said transmission strips being secured to said obliquely cut legs.

References Cited in the file of this patent

UNITED STATES PATENTS

| | | |
|---|---|---|
| 2,183,909 | Henderson | Dec. 19, 1939 |
| 2,511,178 | Roters | June 13, 1950 |